UNITED STATES PATENT OFFICE.

KARL SCHIRMACHER AND RICHARD LEOPOLD, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

VAT-DYESTUFF.

No. 867,306.     Specification of Letters Patent.     Patented Oct. 1, 1907.

Application filed January 26, 1907. Serial No. 354,167.

*To all whom it may concern:*

Be it known that we, KARL SCHIRMACHER and RICHARD LEOPOLD, both Ph. D., chemists, citizens of the Empire of Germany, and residing at Höchst-on-the-Main, Germany, have invented new and useful Improvements in Vat-Dyestuffs, of which the following is a specification.

The object of this invention is the improvement in vat dyestuffs having the general formula:

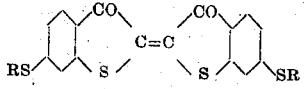

wherein "R" means ethyl and methyl.

The dyestuffs may be obtained by oxidizing oxythionaphthene derivatives resulting from heating 4-alkylthiophenylthioglycollic-o-carboxylic acids $$(RS:SCH_2COOH:COOH=4:2:1)$$

with alkalies. The new dyestuffs are red powders, insoluble in water. They are little soluble in hot alcohol, glacial acetic acid, benzene and chloroform with a yellow-red color, and are yielding with concentrated sulfuric acid greenish-blue solutions. When heated with hydrochloric acid to higher temperatures they split off alkyl chlorids. With alkaline hydrosulfite they yield yellow colored vats of the leucocompounds producing on cotton and wool beautiful shades similar to alizarin red.

The method to obtain the new dyestuffs is, for instance, as follows:

Example: 19.4 parts by weight of 4-acetamino-2-aminophenyl-1-carboxylic acid, obtained by oxidizing 2-nitro-4-acetaminotoluene and subsequent reduction, are diazotized with 20 parts by weight of hydrochloric acid of 20° Bé. specific gravity and 6.9 parts by weight of nitrite and run into a solution of 18 parts by weight of potassium xanthonate and 40 parts of sodium carbonate. On the evolution of nitrogen being complete 15 parts by weight of sodium chloracetate and 30 parts by weight of caustic soda-lye of 40° Bé. specific gravity are added and heated to about 100° C. for about 3 hours. The solution obtained is filtered and the 4-acetaminophenylthioglycollic-o-carboxylic acid is precipitated with a mineral acid. It is a yellowish powder. To eliminate the acetyl, 26 parts by weight of 4-acetylaminophenylthioglycollic-o-carboxylic acid are dissolved with 40 parts by weight of soda-lye of 40° Bé. specific gravity diluted with little water and heated to boiling, till a test portion of the solution on addition of hydrochloric acid no longer precipitates any unchanged acetyl derivative. The solution is acidified, then 20 parts by weight of hydrochloric acid of 20° Bé. specific gravity and 6.9 parts of nitrite are added and the diazo-solution thus obtained is allowed to run at 20-25° C. into a solution of 18 parts by weight of potassium-xanthogenate and 50 parts by weight of sodium carbonate. On the evolution of nitrogen being complete the solution is filtered and the 4-xanthogenate derivative of phenylthioglycollic carboxylic acid of the formula

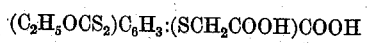

is precipitated with a mineral acid and filtered. This product is boiled on a reflux condenser for 6-8 hours with 35 parts by weight of caustic soda-lye of 40° Bé. specific gravity and a solution of 25 parts by weight of sodium-ethylsulfate; the xanthogenate derivative is so transformed into the 4-ethylthiophenylthioglycollic-ortho-carboxylic acid. When cold it is filtered and the 4-ethylthiophenylthioglycollic-o-carboxylic acid is precipitated with a mineral acid. To transform it into the corresponding 4-ethylthio-oxythionaphthene-carboxylic acid, 26 parts by weight of 4-ethylthiophenylthioglycollic-o-carboxylic acid are introduced into a mixture of 150 parts by weight of caustic soda and 15 parts by weight of water, the whole being heated for some time to 180-190° C. When cold it is dissolved in water and the 4-ethylthio-oxythionaphthene-carboxylic acid may be precipitated with a mineral acid as white powder. It may be re-crystallized from hot water, m. p. about 188° C. Treated with nitrite and hydrochloric acid it yields, as also the 4-ethylthio-oxythionaphthene, obtained from the acid by boiling with hydrochloric acid, a yellow nitroso compound. To obtain the dyestuff 21 parts of 4-ethylthio-oxythionaphthene-carboxylic acid are dissolved with 12 parts of soda-lye of 40° Bé. specific gravity in 1000 parts of water to which is added at gentle heat a 30 per cent solution of 80 parts of potassium-ferricyanid. The dyestuff separates as red flakes and is isolated by filtration and washing with water. It may be purified by dissolving it in alkaline hydrosulfite and re-precipitation by oxidation with air. The properties are the above mentioned.

A dyestuff of very similar properties is obtained by oxidation of 4-methylthio-oxythionaphthene-carboxylic acid obtained in an analogous manner.

Having now described our invention, what we claim is:

As new products, the vat dyestuffs of which the composition corresponds to the formula:

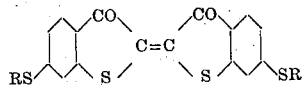

wherein "R" means ethyl and methyl, being red powders, insoluble in water, little soluble in hot alcohol, acetic acid, benzene and chloroform with a yellow-red, soluble in concentrated sulfuric acid with a greenish-blue color, splitting off when heated with hydrochloric acid alkyl chlorids, dissolving in an alkaline hydrosulfit solution with a yellow color to a vat, dyeing wool and cotton alizarin-red tints.

In testimony, that we claim the foregoing as our invention, we have signed our names in presence of two subscribing witnesses.

KARL SCHIRMACHER.
RICHARD LEOPOLD.

Witnesses:
   JEAN GRUND,
   CARL GRUND.